United States Patent
Wang

(10) Patent No.: US 7,309,540 B2
(45) Date of Patent: Dec. 18, 2007

(54) ELECTRICAL POWER SOURCE DESIGNS AND COMPONENTS

(75) Inventor: Conghua Wang, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 437 days.

(21) Appl. No.: 10/851,789

(22) Filed: May 21, 2004

(65) Prior Publication Data

US 2005/0260473 A1 Nov. 24, 2005

(51) Int. Cl.
- *H01M 8/10* (2006.01)
- *H01M 8/18* (2006.01)
- *H01M 4/10* (2006.01)
- *H01M 6/18* (2006.01)
- *B01J 8/08* (2006.01)

(52) U.S. Cl. .......................... 429/33; 429/19; 429/44; 429/309; 422/199; 422/232

(58) Field of Classification Search .................. None
See application file for complete search history.

(56) References Cited

U.S. PATENT DOCUMENTS

| | | | |
|---|---|---|---|
| 6,379,476 B1 | 4/2002 | Tarutani et al. | |
| 6,541,147 B1 | 4/2003 | McLean et al. | |
| 2003/0180598 A1* | 9/2003 | Fischer et al. | 429/34 |
| 2005/0037253 A1* | 2/2005 | Faghri | 429/34 |

FOREIGN PATENT DOCUMENTS

JP 8-180883 7/1996

* cited by examiner

*Primary Examiner*—Dah Wei Yuan
*Assistant Examiner*—Karie O'Neill
(74) *Attorney, Agent, or Firm*—Lowenstein Sandler PC

(57) ABSTRACT

Provided, among other things, is ion-conductive membrane assembly comprising: a porous core; and sandwiching the porous core therebetween, two ion-conductive membranes; wherein the porous core is adapted to retain a ion-conductive liquid.

8 Claims, 8 Drawing Sheets

ELECTRICAL POWER SOURCE DESIGNS AND COMPONENTS

The present invention relates, among other things, to fuel cells and other electrochemical power sources, including stacked fuel cell assemblies, and devices for use in fuel cells. The present invention can also be applied in other electrochemical systems, such as reversible fuel cells and flow batteries.

A stacked fuel cell assembly FCS is illustrated in FIG. 1A. The basic element is a fuel cell 5, composed of a membrane-electrode assembly 1, a cathode chamber on one side of the membrane electrode assembly 1, and an anode chamber on the other. These chambers are provided within the illustrated seals 2. Between these fuel cell elements 5 are bipolar plates 3. The bipolar plates electrically connect the stacked fuel cells 5. Often additional cooling plates 6 are incorporated to improve heat dissipation. In the illustration, the stack is closed at the two ends by end plates 4. A fuel cell is shown in isolation in FIG. 1B. The membrane electrode assembly typically includes electrolyte 16 (such as a polymer electrolyte membrane or alkaline electrolyte) and electrodes 17 and diffusion layers 7. The electrodes typically include supporting material and catalyst such as a precious metal, transition metal or alloy of these.

The ion-conductive membranes used in fuel cells typically work at a temperature below 95° C., using clean hydrogen as the fuel. Some membranes work with a methanol fuel, but have unsatisfied penetration of methanol through the membrane (methanol cross-over), which lowers energy efficiency. Thus, there is a need for new membranes that work at higher temperature (120~200° C.) for hydrogen fuel cells, or have low methanol crossover rate for direct methanol fuel cells. The present invention provides, among other things, designs for ion-conductive membranes that address these issues.

The catalyst-supporting materials are typically used to support catalyst particles, and to conduct electrons from catalyst particles to a gas diffusion layer, then to bipolar plate, and then to the next cell in the stack. Carbon black is normally used as the supporting material, but it is difficult to consistently process carbon black and its electronic conductance is not satisfactory. The present invention provides, among other things, designs and processing method for the catalyst supporting layers that improve electrical connectivity.

The bipolar plates must be electrically conductive but not permit the migration of reactants from the separated fuel cells. Graphite plates are often used, but such plates are expensive, and their mechanical strength is less than desirable. Metals can be used, but metal plates are often too susceptible to corrosion. Gold, and more exotic metallic materials that have been developed have greater chemical resistance, but the cost of corrosion resistant metallic materials is high. In addition, the electrical flow field and surface properties of bipolar plates are important to the performance of fuel cells, flow batteries, and the like. The present invention provides, among other things, (i) designs for bipolar plates that address these problems and (ii) designs of gas diffusion layers for the new bipolar plates.

The diffusion layers should have porous structure and be electrically conductive. Moreover, the electrical contacting resistance between the diffusion layers and electrodes or bipolar plates should be minimized to reduce internal power losses. The present invention provides, among other things, diffusion layers that allow for low contacting resistance.

To use hydrogen fuel cells in mobile and portable applications such as cars, trucks, tractors and the like, or radio, mobile phone, media players and the like, a source of hydrogen fuel with high fuel density would be useful. The present invention provides, among other things, designs to provide a high density hydrogen source and designs for integrating hydrogen sources into a complete fuel cell power system.

The designs described are believed to decrease manufacturing cost, increase fuel cell efficiency, and reduce fuel cell weight or volume.

EXEMPLARY EMBODIMENTS

Provided, in one embodiment, is an ion-conductive membrane assembly comprising: a porous core; and sandwiching the porous core, two ion-conductive membranes; wherein the porous core is adapted to retain an ion-conductive liquid. Such an ion-conductive membrane can be used in an electrochemical power source, for example operating at 30° C. to 200° C., or 110° C. to 200° C.

Provided in another embodiment is a porous electrode comprising: a porous conductive matrix; carbon nano-tubes supported by the porous conductive matrix; and electrode catalyst deposited on the carbon nano-tubes.

Provided in another embodiment is a stacked electrochemical power source assembly comprising: two or more electrochemical cells; a bipolar plate between two electrochemical cells (i) comprising a metal layer and one or more resistant layers comprising conductive vias through the resistant layer(s) or (ii) consisting essentially of (1) a core comprising a resistant layer comprising conductive vias through the resistant layer, and (2) metal coatings on two primary surfaces of the resistant layer. The "consisting essentially" refers to items (1) and (2), though item (1) for example comprises its features. Where it is a surface layer, a "resistant" layer is one that is sufficiently resistant to corrosion due to contact with an associated electrochemical cell that it would allow (if this were the only variable) for a reasonable lifetime for the stacked electrochemical power source. Where internal, a "resistant" layer is one that does not have sufficient electrical conduction such that the vias improve function as a power source. Such resistant layers can be, but need not be, made of material considered to be dielectric.

Provided in another embodiment is a electrochemical power source assembly comprising: two or more electrochemical power cells; a bipolar plate between two said electrochemical power cells; and for one or more said electrochemical power cells, a diffusion layer located between a ion-conductive membrane of a said electrochemical power cell and a said bipolar plate, the diffusion layer comprising: a porous carbon blanket comprising on at least one major surface a pattern of conductive areas having greater conductive capacity than the carbon blanket, the areas adapted to electrically contact a said bipolar plate. The bipolar plate comprises electrical contacts adapted to align with and contact the conductive areas of the diffusion layer.

Provided in another embodiment is a solid hydrogen source comprising: a vessel comprising a mixture of complex hydride and active metal, an inlet channel and an outlet channel; and an electrical heater for heating the complex hydride/metal mixture. Such solid hydrogen sources can be used with conduits with one or more valves between the source of water to generate hydrogen on demand.

DETAILED DESCRIPTION OF THE INVENTION

Figure 1A:
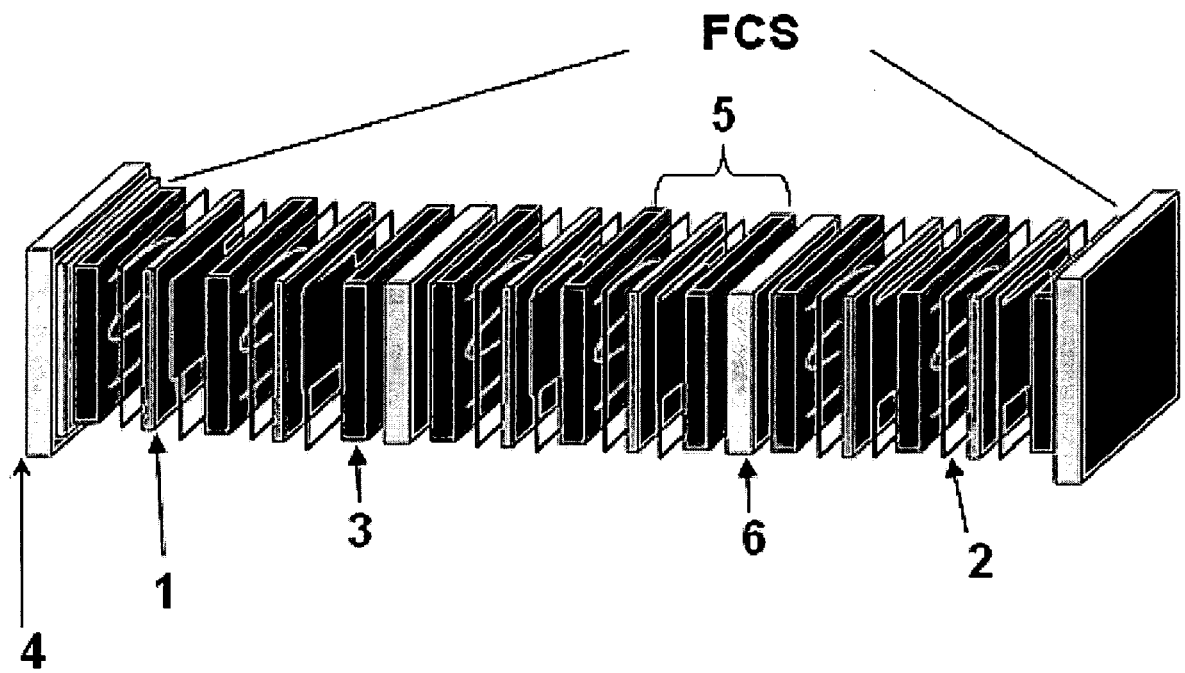
FIGS. 1A and 1B display the basic elements of a fuel cell stack.
Figure 1B:
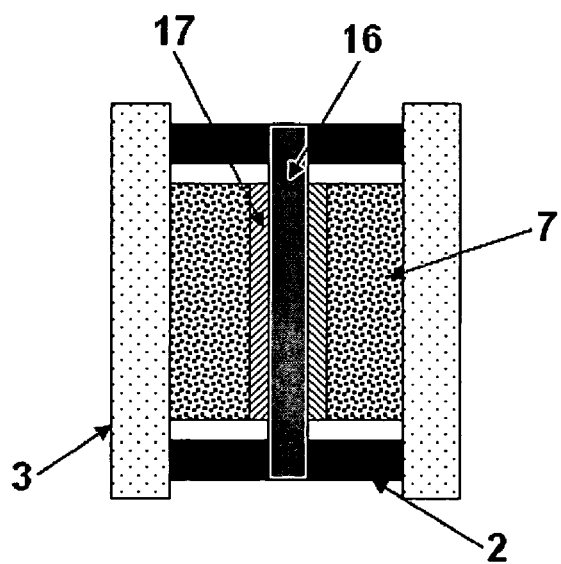
Figure 2:
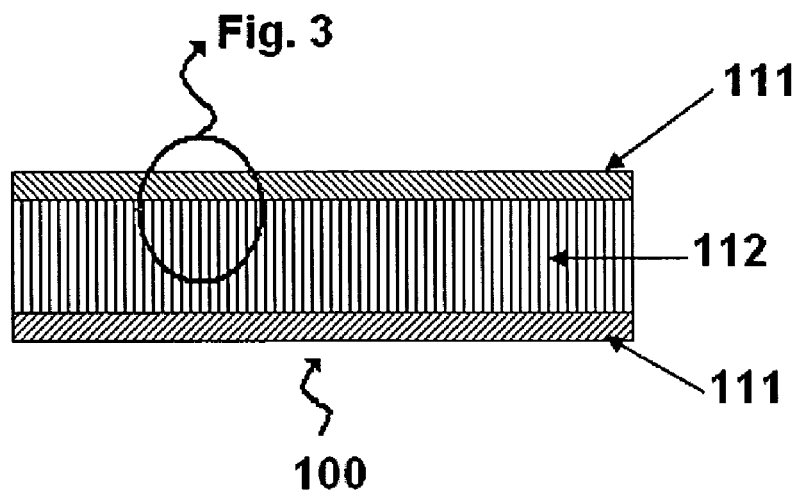
FIGS. 2 and 3 show elements of hybrid ion-conductive membranes.

FIG. 2 shows a hybrid ion-conductive membrane assembly 100 with layers of ion-conductive membrane 111 sandwiching a porous core 112. While one sandwiched porous core is believed sufficient in many instances, more are possible. In operation, the porous core 112 is soaked in liquid electrolyte solution, such as acid aqueous solution. The ion-conductive membrane 111 can be, for example, Nafion (available from Dupont) or the like.

The porous material can be, for example, quartz, glass, ceramic or metal. If glass or quartz, it can be etched to provide pores, or it can be glass fiber blanket, cloth and paper. The thickness of the porous core is, for example, from 10 to 2000 microns. The thickness can be, in certain embodiments, from one of the following lower endpoints (inclusive) or from one of the following upper endpoints (inclusive). The lower endpoints are 10, 20, 50, 100, 200, 400, 800, 1,200, 1,600 and 2,000 microns. The upper endpoints are 20, 50, 100, 200, 400, 800, 1,200, 1,600, 2,000 and 5,000 microns. For example, the thickness can be from 50 to 200 microns. The pore size can be, in certain embodiments, from one of the following lower endpoints (inclusive) or from one of the following upper endpoints (inclusive). The lower endpoints are 5, 10, 20, 50, 100, 200, 400 and 800 nm and 1, 5, 10, 20, 30, 50 and 100 microns. The upper endpoints are 10, 20, 50, 100, 200, 400 and 800 nm and 1, 5, 10, 20, 30, 50, 100 and 200 microns.

Figure 3:
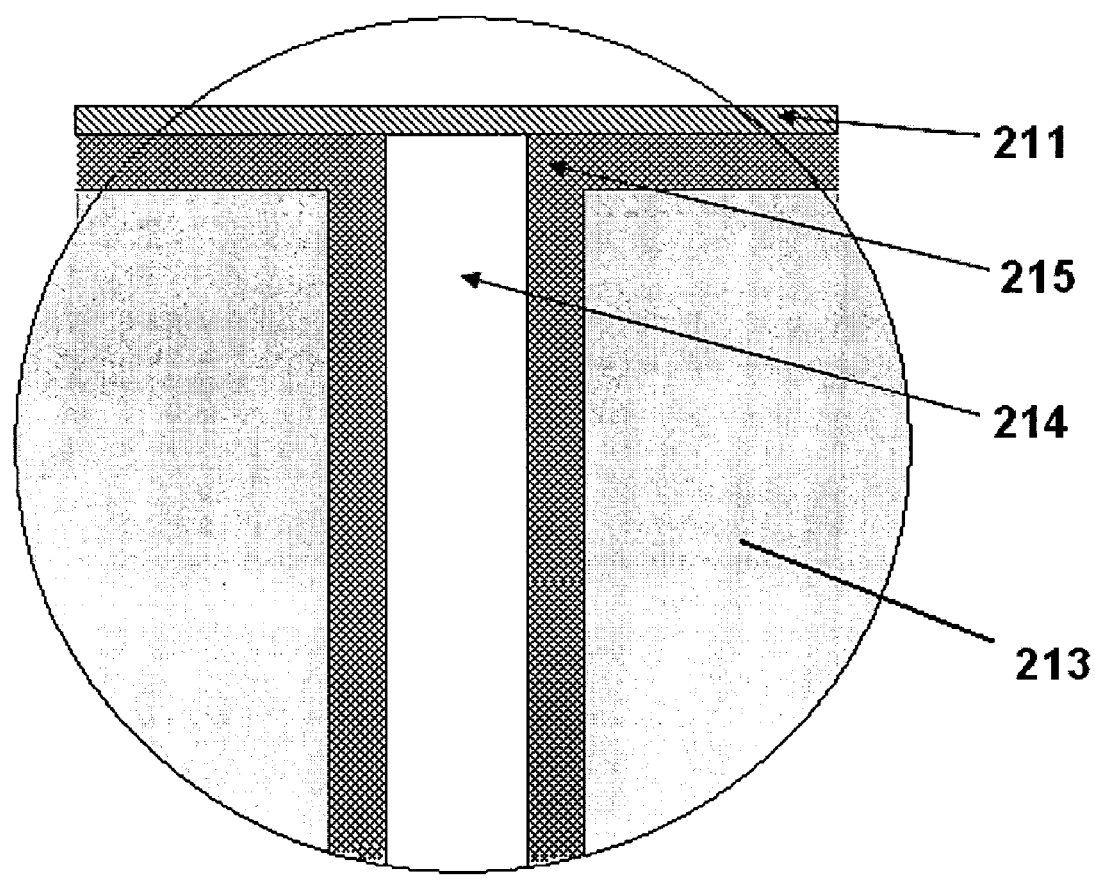

FIG. 3 shows a blown up view of a section of a embodiment of a hybrid ion-conductive membrane assembly. The section expanded for view is indicated in FIG. 2 (assuming for this purpose of illustration only that the embodiment was employed in the ion-conductive membrane assembly illustrated in FIG. 2). This embodiment has primary pores 214 and meso pores 215. Primary and meso pores can comprise the entire core region, or there may be a structural or filler component 213. The meso pore size can be, in certain embodiments, from one of the following lower endpoints (inclusive) or from one of the following upper endpoints (inclusive). The lower endpoints are 5, 10, 20, 50, 100, 200, 300 and 400 nm. The upper endpoints are 20, 50, 100, 200, 300, 400 and 500 nm. For the larger pores (e.g., primary pores 214), the pore size can be, in certain embodiments, from one of the following lower endpoints (inclusive) or from one of the following upper endpoints (inclusive). The lower endpoints are 100, 200, 400 and 800 nm and 1, 5, 10, 20 and 30 microns. The upper endpoints are 200, 400 and 800 nm and 1, 5, 10, 20, 30, 50, 100 and 200 microns.

The thickness of the polymer layers in a hybrid membrane can be, in certain embodiments, from one of the following lower endpoints (inclusive) or from one of the following upper endpoints (inclusive). The lower endpoints are 0.1, 0.2, 0.5, 1, 2, 5 and 10 microns. The upper endpoints are 0.2, 0.5, 1, 2, 5, 10 and 20 microns. For example, the thickness can be from 0.5 to 2 microns. The total thickness of the hybrid ion-conductive membrane assembly can be, in certain embodiments, from one of the following lower endpoints (inclusive) or from one of the following upper endpoints (inclusive). The lower endpoints are 1, 5, 10, 20, 50, 100 and 200 microns. The upper endpoints are 25, 50, 100, 200, 500 and 1,000 microns. For example, the thickness can be from 25 to 100 microns.

The hybrid ion-conductive membrane assembly embodiments of FIGS. 2 and 3 provide the high electrolyte conductance, because liquid electrolyte has much higher conductivity than that of polymer electrolyte. In addition, the direct contact of thin film polymer electrolyte with liquid electrolyte in the porous core substrate improves the migration of water into polymer membrane to keep the membrane wetted, simplifying water management. Because the membrane polymer can be thinned, its electrical resistance is reduced, thereby overcoming a problem with the low conductance of membranes designed for high temperature operation. Similarly, it is believed that membranes with low transmission of methanol or other organic, which traditionally have low proton conductance, can be thinned to maintain useful low organic transmission but more effective proton conductance.

In certain embodiments, the hybrid ion-conductive membrane assembly is operated at relatively high temperature. For example, the temperature can be from one of the following lower endpoints (inclusive) or from one of the following upper endpoints (inclusive). The lower endpoints are 10, 25, 50, 60, 70, 80, 90, 100, 110, 120, 130, 140 and 150° C. The upper endpoints are 90, 100, 110, 120, 130, 140, 150, 180 and 200° C. For example, the temperature can be from 110 to 180° C. or 110 to 200° C.

In one embodiment, the hybrid ion-conductive membrane assembly is utilized in a reversible fuel cell, such as a hydrogen-halogen battery. A low halogen crossover rate polymer membrane is used in the hybrid membrane to achieve high proton conductance and low halogen crossover.

In one embodiment, the hybrid membrane assembly is used in a flow battery application such a sodium polysufide and vanadium redox flow battery. A polymer membrane that has low crossover of the components in the electrolyte solution, such as low crossover of sulfur and bromine ions, or vanadium ions is used in the hybrid membrane to achieve the high active ionic (such as sodium ion or proton) conductance and low crossover of other components.

Figure 4:
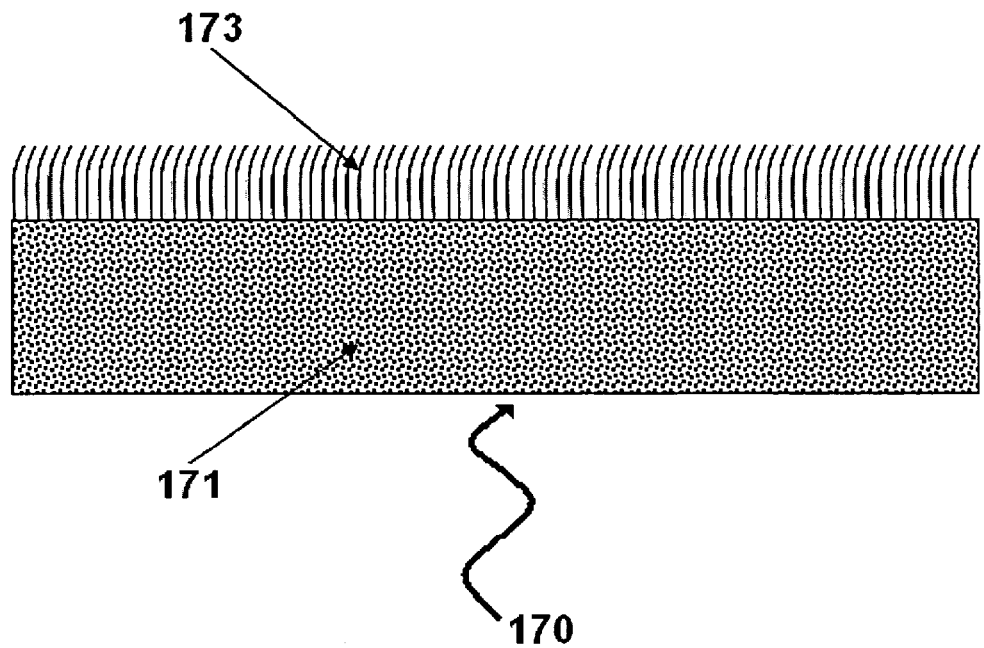
FIGS. 4 and 5 show electrode structures.

To improve the electrochemical power source electrode performance, a carbon nano-tube containing electrode is constructed by depositing the electrode catalyst on carbon nano-tubes 173 that are affixed on the surface of a porous supporting matrix, such as the gas diffusion layer 171, as illustrated in FIG. 4. To make such a nano-tube containing electrode, for example, first a carbon nano-tube forming catalyst can be deposited on the supporting matrix 171. Then carbon nano-tubes 173 are grown on the matrix using elevated temperature and a carbon-containing atmosphere, for example using the conditions described by U.S. Pat. No. 6,692,717. The electrode catalyst can then be deposited on the carbon nano-tubes. The high surface area and the high electronic conductivity of carbon nano-tubes is believed to significantly improve electrode performance.

The nano-tube forming catalyst is, for example, a transition metal such as Ni, Co, Fe, Cr, V, Mn, or a precious metal such as Pt, Gd, Ag, Ru, Rh or their alloys. The catalyst can be deposited for example by vacuum deposition and other physical processes, or sol-gel and other wet chemical processes. The nano-tube forming catalyst can also be catalytic particles of silicon (such as the process described by Nature, Oct. 29, 1998, vol. 395, pp. 878-881), or SiC. The Si and SiC particles can be deposited by chemical vapor deposition, or by reacting at elevated temperature deposited silicon with graphite in supporting matrix 171. In some embodiments, the nano-tube containing electrode is used in a flow battery and reversible fuel cells.

Figure 5:
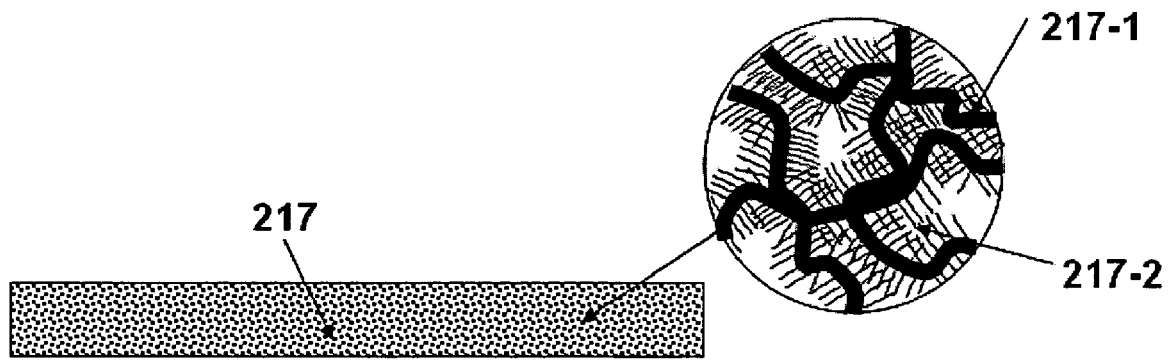

In some embodiments, the nano-tube containing electrode is used in a flow battery or a reversible fuel cell. In these embodiments in particular, the electrode catalyst supporting nano-tubes 217-2 can favorably be rooted on and within supporting matrix 217 (3-dimension complex structure as illustrated in FIG. 5), with support from matrix fibers 217-1. This 3-D complex electrode structure will provide both the high surface area for catalyst supporting and large pores for the mass transportation of liquid electrolyte solutions through the porous supporting matrix.

Figure 6A:
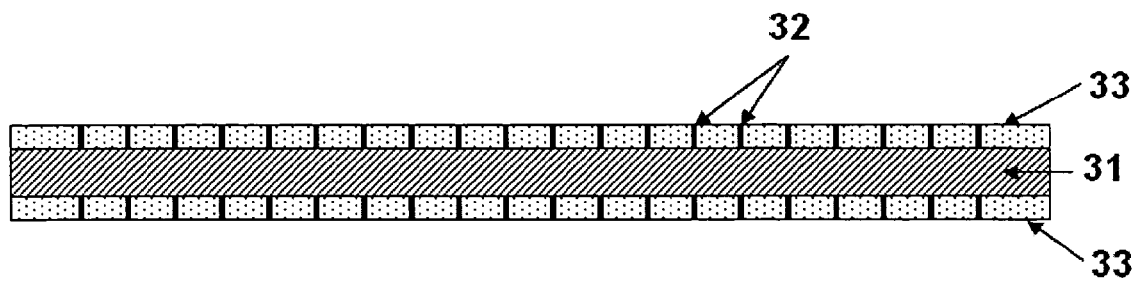
FIGS. 6A and 6B show bipolar plates.

In one embodiment, a bipolar plate 30 has a metallic core 31, conductive vias 32 for electrical connectivity across the bipolar plate, and resistant layer 33 (FIG. 6A). The metallic core layer can, for example, be dense, porous, or have a porous surface with a dense inner core. The resistant layer can provide strength and/or protection of the metal core against corrosion. The exterior end of the conductive vias 32 are optionally coated with a corrosion-resistant metallic material such as gold (not shown).

Figure 6B:
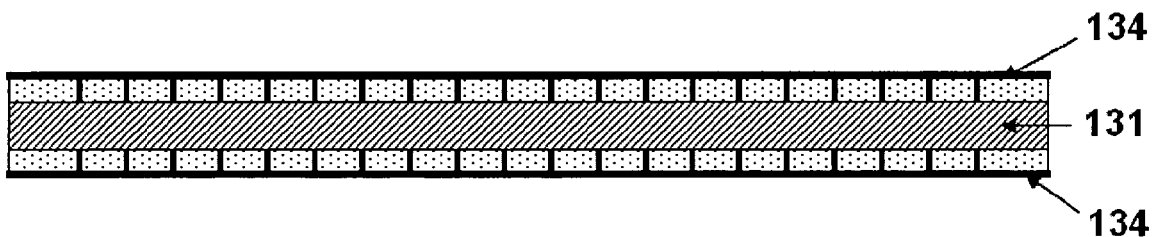

Or, as in the embodiment of FIG. 6B, the surface of the bipolar plate can be uniformly coated with a layer of corrosion-resistant conductive material 134 to improve the surface conductivity of the bipolar plate. Corrosion resistance is resistance in the working environment anticipated for the bipolar plate. The corrosion-resistant conductive material can be, for example, platinum, gold, suitable alloys, carbon (graphite), and the like.

The thickness range of the metallic core (under the surface scale) is, for example, from one of the following lower endpoints (inclusive) or from one of the following upper endpoints (inclusive). The lower endpoints are 20, 50, 100, 200 and 500 microns (μm). The upper endpoints are 200, 500, 1000, 2000 and 3000 microns (μm). For example, the thickness can be from 100 to 300 microns.

The conductive via 32 can have, for example, round, square or other cross-sectional shape, having cross-sectional dimension (in the larger dimension) of, for example, between 10 to 10,000 microns (μm). The cross-sectional dimension is, for example, from one of the following lower endpoints (inclusive) or from one of the following upper endpoints (inclusive). The lower endpoints are 10, 25, 50, 100, 200, 500 and 1,000 microns (μm). The upper endpoints are 50, 100, 200, 500, 1,000, 2,000, 3,000 and 4,000 microns (μm). For example, the cross-sectional dimension can be from 25 to 500 microns or 50 to 500 microns or 100 to 500 microns. The height of the conductive via 32 can be same as the thickness of the resistant layer, or higher. The vias extending above the surface of the resistant layer can provide lower electrical contacting resistance in the stack. The via can use different materials in different segments, such as more corrosion resistant material at the top (close to exterior ends), or a bonding layer to facilitate contact with a metallic core. The amount of the vias is determined by the cell operation current density. At low operating current density, such as flow batteries, there can be one via in several square centimeters. At high operating current density, such as high power electrochemical power sources, there can be hundreds vias in each square centimeter.

In certain embodiments, the vias are 50% or less, 40% or less, 30% or less, 20% or less, 10% or less, 5% or less, 2% or less, 1% or less, 0.5% or less of the volume of the resistant layer through which they traverse.

The resistant layer thickness is determined by the application process of the resistant coating. The resistant layer thickness can be from one of the following lower endpoints (inclusive) or from one of the following upper endpoints (inclusive). The lower endpoints are 0.1, 1, 10 and 50 microns (μm). The upper endpoints are 10, 20, 50, 100, 500 and 2000 μm. For example, the thickness can be from 5 to 50 microns (μm).

The range of the bipolar plate total thickness is, for example, from one of the following lower endpoints (inclusive) or from one of the following upper endpoints (inclusive). The lower endpoints are 10, 50, 100, 200 and 500 microns (μm). The upper endpoints are 200, 500, 1000, 2000 and 5000 microns (μm). For example, the thickness can be from 100 to 300 microns.

The resistant layer can be formed as a dense thin film surface scale by the reaction of a metal layer under conditions recognized in the art. Metals that form a suitably dense surface scale include, for example, stainless steel, or titanium. In this case, the conductive vias can be formed by spot-depositing the conductive via material prior to forming the surface scale coating. The spot-depositing process can be printing, electroplating, spurting and the like. To form the dense surface scale, the metal core can be, for example, heated to an appropriate temperature, such as 100° C. to 1300° C., in the presence of oxygen or nitrogen.

Alternatively, the resistant layer can be formed by a thick film process. In such a process, a resistant tape is formed and small holes are punched on the tape for conductive vias. Then, the resistant tape is laminated on the metal core plate. The conductive vias can be applied into holes on the resistant tape before or after lamination. The process to apply the conductive via material can be screen printing, filling, and the like. The resistant material can be, for example, polymer or ceramic (including glass ceramic). In the case of ceramic resistant material, the ceramic layer can be laminated as a green tape, and then fired together with the metal core at high temperature to densify the green tape obtain the resistant layer. One way to apply the ceramic resistant layer on the metal core plate using Low-Temperature Co-fired Ceramic-on-Metal technology (LTCC-M), such as described in U.S. Patents U.S. Pat. No. 5,581,876, U.S. Pat. No. 5,725,808, U.S. Pat. No. 5,747,931, U.S. Pat. No. 6,140,795.

In one embodiment, the metal core layer is porous (including having a porous surface with a dense inner core) and the resistant layer is thin film. The resistant layer can coat the whole surface (including the internal surface of the porous metal layer) to protect the metal against the corrosion.

Figure 7A:
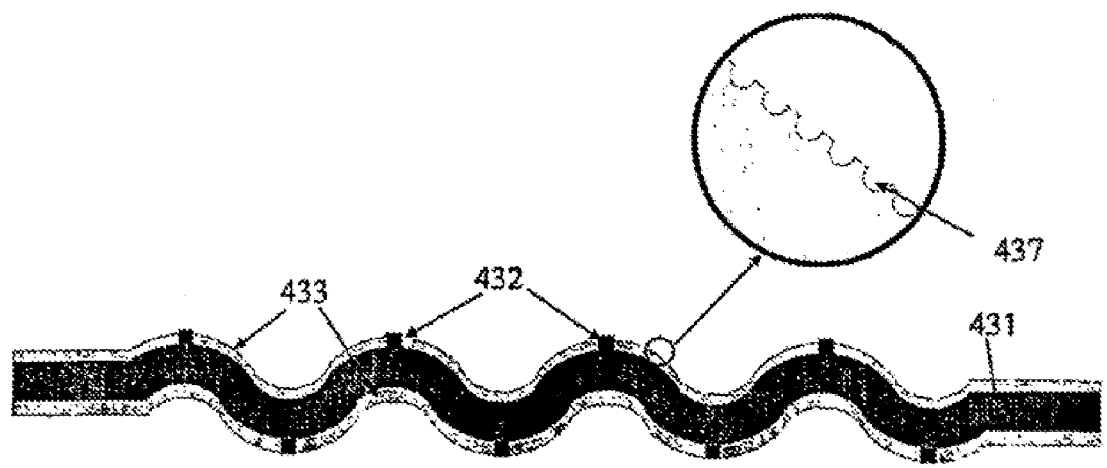
FIGS. 7A, 7B, 7C, 8, 9 and 10 show bipolar plates.

In one embodiment, the bipolar plate can be corrugated. As shown in FIGS. 7A, the conductive vias 432 are at the high points (or low points on the lower side) of the bipolar plate 431, thereby facilitating contact with the electrodes or diffusion layer of fuel cells, batteries, and the like. The corrugated bipolar plates can have the corrugations shaped to provide channels for fluid (including gas for fuel cells and liquid for flow batteries) transportation. The shape and dimension of the corrugation can be optimized for the best performance of the fuel cells, flow batteries, or the like.

The shape of the corrugation can be angular (with straight or curved segments) or curved or with island (or peninsula) shapes. On a given side of the bipolar plate or both sides, the bump-to-bump distance can be, in certain embodiments, from one of the following lower endpoints (inclusive) or from one of the following upper endpoints (inclusive). The lower endpoints are 0.02, 0.04, 0.06, 0.08, 0.1, 0.2, 0.4, 0.6, 0.8, 1.0, 1.5, 2.0, 2.5, 3.0, 3.5, 4.0 and 4.5 mm. The upper endpoints are 0.04, 0.06, 0.08, 0.1, 0.2, 0.4, 0.6, 0.8, 1.0, 1.5, 2.0, 2.5, 3.0, 3.5, 4.0, 4.5 and 5.0 mm. For example, the distance can be from 0.02 to 5 mm, or 0.1 to 2 mm. "Corrugations" means any pattern of high and low spots on an overall shape appropriate for use as a bipolar plate.

In one embodiment, there can be embedded micro-channels or pits 437 on surface of the corrugated area, as illustrated in the inset to FIG. 7A. The micro-channels or pits 437 are sized and adapted to spread out water condensing on the corrugations. The micro-channels or pits can reduce the formation of water drops of a size effective to block the gas along the corrugations (e.g., in channels formed by the corrugations). The shape of the micro-channels or pits 437 can have, for example, round, square or other cross-sectional shape, having dimension (in the larger dimension) of, for example, between 1 to 500 microns (μm). The cross-sectional dimension (width) is, for example, from one of the following lower endpoints (inclusive) or from one of the following upper endpoints (inclusive). The lower endpoints are 1, 5, 50, and 100 microns (μm). The upper endpoints are 50, 100, 200, and 500 microns μm). For example, the cross-sectional dimension can be from 25 to 100 microns or 50 to 200 microns. Typically, these microchannels are smaller than the channels illustrated in FIG. 9.

Figure 8:
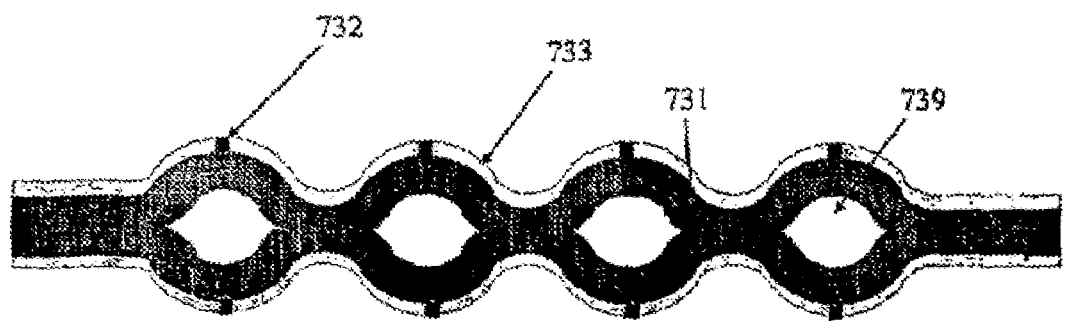

In one embodiment, two or more pieces of metal sheet can be welded or otherwise bonded or joined together to form a hollow core 739, as illustrated in FIG. 8. The channels in the hollow core can be used as heat exchange channels for the bipolar plate. A heat exchange medium, such as water, can flow through the hollow core to control the temperature of the fuel cell, flow battery stack, or the like. Bonded metal subparts forming a metallic core, as illustrated by the two pieces illustrated in FIG. 8, can be a "metal layer."

Figure 9:
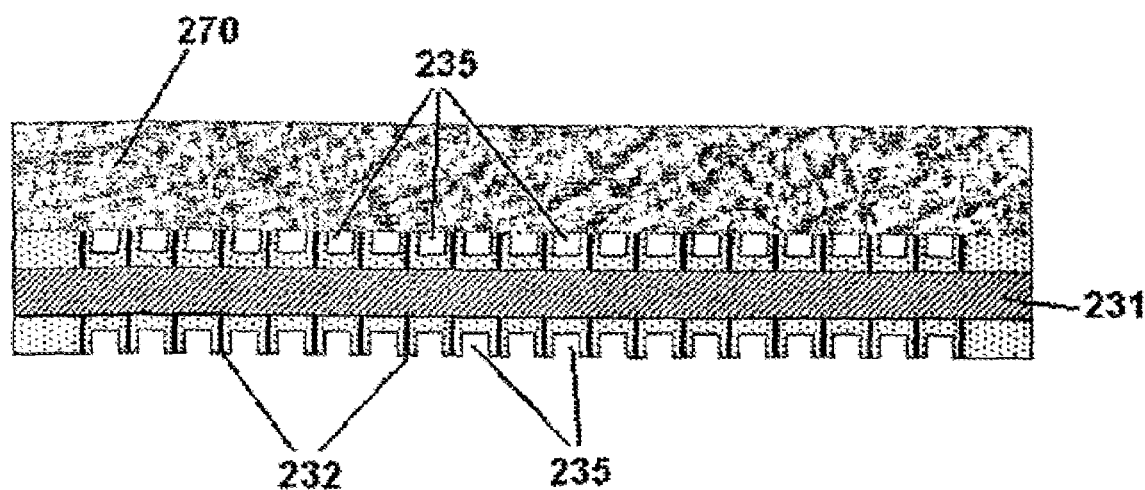

In one embodiment using a thick film resistant surface coating, the bipolar plate can incorporate channels 235 in the resistant layer 233 to facilitate (e.g., act as a manifold) the transportation of gas or other fluid, as illustrated in FIG. 9 (which includes diffusion layer 270). The channels 235 can be formed by embossing or the like before or after the resistant tape is laminated to the metal core layer. While not illustrated, the surface of the bipolar plate of this embodiment can be covered with conductor, similar to the covering illustrated in FIG. 6B, but with the conductor surface following the channel-forming contours.

Figure 7B:
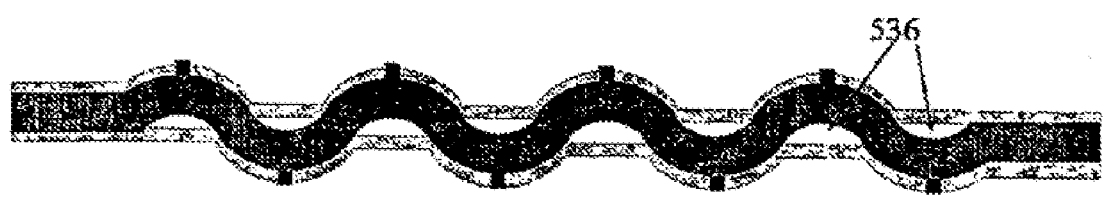
Figure 10:
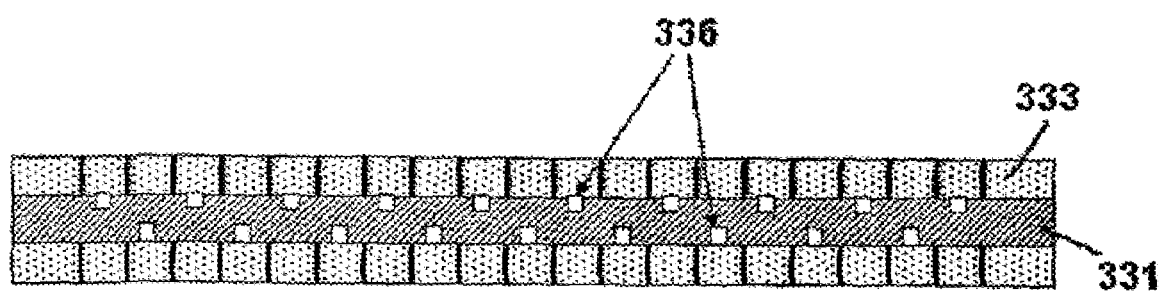

In one embodiment using a thick film resistant surface layer, the bipolar plate can enclose heat exchange channels 336 or 536 between the resistant layer 231 or 535 and metal core layer 331 or 534, as shown in FIGS. 10 and 7B. Heat exchange medium, such as water, can flow through these enclosed channels to control the temperature of the fuel cell, flow battery stack, or the like.

Heat exchange channels 336 can be formed, for example, by shaping the metallic core prior to applying the resistant material, then applying the resistant layer so as to concurrently form the channels. The heat exchange channel 536 can be formed, for example, by controlled lamination of the resistant tape 535 on the metal to keep the conduits 536, or by applying combustible material such as graphite or polymer powder to the locations of the conduits 536, laminating the resistant tape 535 (such as with ceramic tape), and firing the laminate to clear the conduits 536.

Figure 7C:
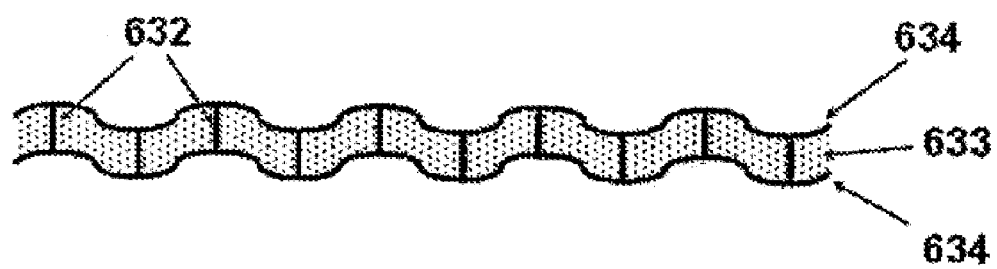

In one embodiment, as shown in FIG. 7C, the bipolar plate has a resistant layer 633 as its core with thin metal foils 634 on both sides and the conductive vias 632 through the resistant core layer 633 to establish the electrical connection through the bipolar plate. Surface metal foil 634 can be a uniform covering or can be patterned on the surface to connect the various conductive vias 632. While this embodiment is illustrated with a corrugated bipolar plate, planar bipolar plates may also be designed in this way. In certain embodiments, the range of the thickness for the ceramic core 633 is from one of the following lower endpoints (inclusive) or from one of the following upper endpoints (inclusive). The lower endpoints are 10, 50, 100, 200, 500 microns (μm). The upper endpoints are 50, 100, 200, 500, 1000 microns. For example, the thickness can be from 10 to 50 microns, or 100 to 500 microns. The surface metal foil 634 is the one selected to resist corrosion in the particular electrochemical power source. Such metallic materials include gold, platinum, suitable alloys, and the like. The metal foil 634 in a thickness sufficient, in combination with the other components of the bipolar plate, to separate reactants and products in cathode and anode chambers.

Figure 11A:
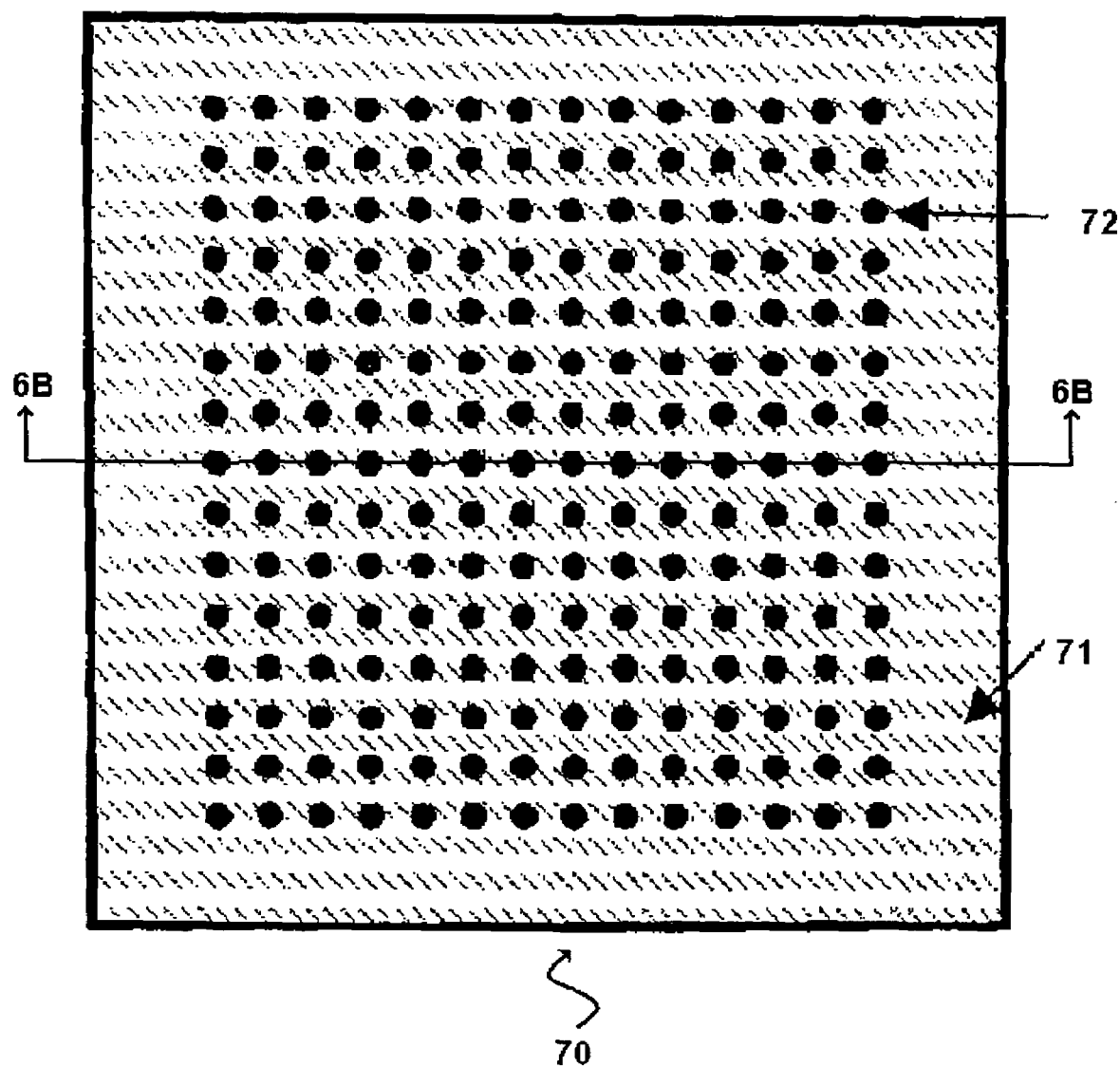
FIGS. 11A and 11B show a diffusion layer.
Figure 11B:

FIGS. 11A and 11B show a diffusion layer 70 made up of a porous carbon matrix sheet 71 and contacting areas 72. These contacting areas 72 have higher electrical conductance than that matrix sheet. In the fuel cell and flow battery assembly, these contacting areas can be aligned with the electrical conductive vias to ensure the electrical integrity of the whole system.

The contacting areas 72 can be dots having round, square or other shapes. It can also be a continuous line or strip (not shown in the Figure) to match the whole contacting area of bipolar plates. This low contacting resistance diffusion layer can be used with conventional graphite based bipolar plates in fuel cells, flow batteries, and the like. In certain embodiments, the surface area of the face of the diffusion layer taken by the contacting areas is 50% or less, 40% or less, 40% or less, 20% or less, 10% or less or 5% or less.

The major surface dimensions of the diffusion layer can be same as those of the corresponding electrode and the bipolar plate. In certain embodiments, these diffusion layers can be smaller strips, aligned and attached on the bipolar plates.

These contacting areas 72 can use the same material but denser (lower porosity) structure than that of matrix, or use different materials that have better performance, such as higher conductivity, chemical stability, stronger adhesion, or the like. These conductive areas can be made, for example, by applying conductive ink and heating the conductive ink to sinter it into an effective conductor. The applying process can be printing, vacuum deposition, electroplating, and the like. If necessary to increase the mass or height of the contacting areas, the applications can be repeated as many times as needed. The electrode or the bipolar plate may or may not have completely matching spots, such as raised spots, for contacting the contacting areas 72.

The low energy density of gaseous hydrogen is an obstacle to its use in mobile devices. While the complexity of handling liquid hydrogen is a barrier to its use, hydrides may serve as a high dense hydrogen source of hydrogen for electrochemical power sources.

Among all hydrides, complex hydrides are the most promising as a dense energy sources, provided such hydrides are properly managed. Such complex hydrides include, for example, borohydrides and aluminum hydrides. Such hydrides include $M(BH_4)$ and $M(AlH_4)$, where M is Li, Na, K, $NH_3$ or $NH_4$.

Perhaps the simplest way to get hydrogen out of the hydrides is through pyrolysis reactions, illustrated by:

$$2NaBH_4 \rightarrow 2NaH + 2B + 3H_2, \qquad \text{(I)}$$

Another way to get hydrogen is through its reaction with water, illustrated by $$NaBH_4 + 2H_2O \rightarrow NaBO_2 + 4H_2, \quad (II)$$

Reaction II provides even more hydrogen. In a electrochemical power source system, water can generated from the electrochemical power source operation, and collected from the exhaust. However the products of reaction II tend to absorb water to form hydrate such as:

$$NaBO_2 + 2H_2O \rightarrow NaBO_2 \cdot 2H_2O \quad (III)$$

The hydrate will form a reaction-interfering hydrate shells that can stop the complete reaction of the hydride. The effective way to avoid this problem is to conduct the reaction at elevated temperature, such as 120–200° C.

Figure 12:
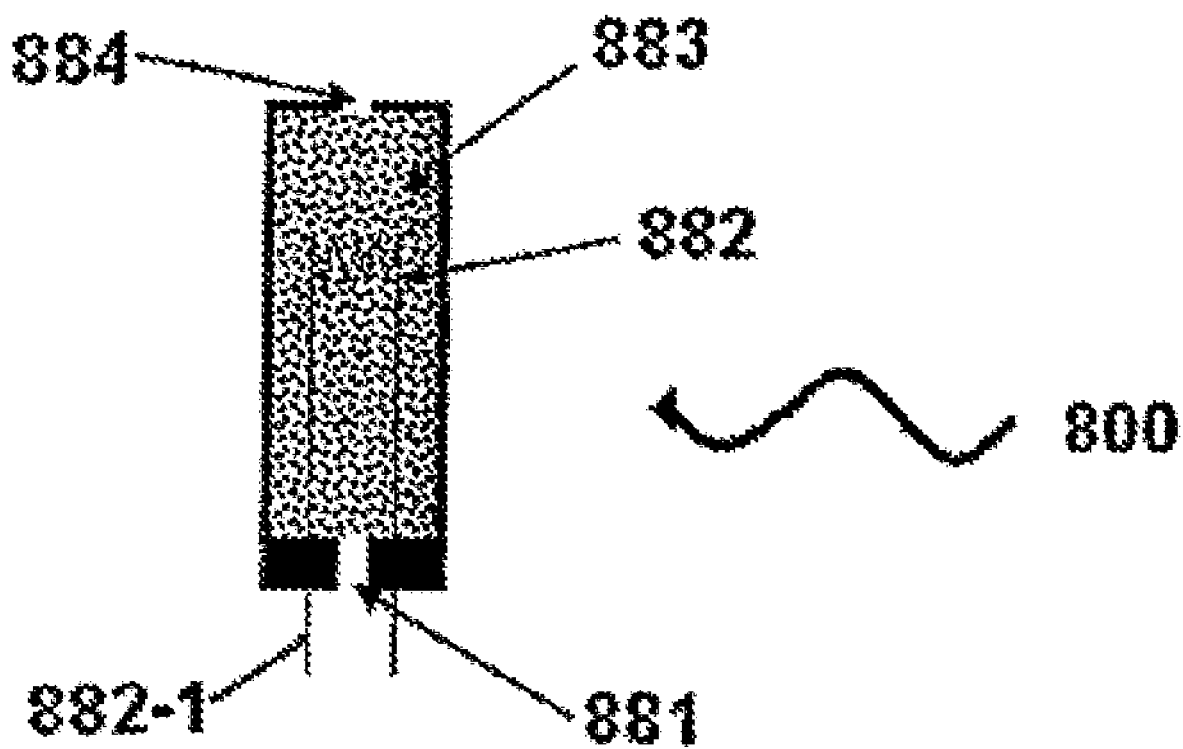
FIG. 12 shows a solid hydrogen source.

The solid hydrogen source 800 of FIG. 12 provides a useful, energy effective way to store and extract hydrogen. The solid hydrogen source is made up of a container with water feed channels 881, heating element 882 (powered by electrical leads 882-1), hydrogen-producing composition 883 and hydrogen release channel 884. The hydrogen-producing composition can be hydrides or a mixture of hydrides and reactive metal. The reactive metals include for example Fe, Ni, Mn, Co, Zn, Mg, Na, Li, Ca and Mg. Metal can be present in powdered form. A reactive metal is one that is reactive with water to release hydrogen and heat, as illustrated by:

$$Mg + 2H_2O \rightarrow Mg(OH)_2 + H_2 + heat. \quad (IV)$$

The reactive metal can provide a primary source of heat after the reaction is initialized by the heating element 882, keeping the cell at elevated temperature to avoid the hydrate formation. The reaction can be initialized by the heating element 882.

The heating element can serve to ignite the hydrogen-releasing reaction or to accelerate the reaction. The heating element can be consumed in the processes that occur in the hydride cells. For example, the heating elements can be formed of reactive metal. Typically, when the hydride cells contain reactive metal, the heating element is needed only at the initial stage of the release process.

In one embodiment, the water for reaction II can be provided from the fuel cell stack in a power system. In addition, excess water generated in the stack can be removed from exhaust gases and absorbed in depleted hydride of depleted solid hydrogen sources by reaction III.

Definitions

The following terms shall have, for the purposes of this application, the respective meanings set forth below.

Electrochemical Power Source

An electrochemical power source is a fuel cell, flow battery, or the like.

Ion-Conductive Membrane

An ion-conductive membrane is sufficiently selective for conducting protons or metal ions and excluding transmission of one or more reactants of a electrochemical power source to allow operation of the electrochemical power source. Examples include proton-conductive membranes and sodium ion-conductive membranes.

Metal Coating

A metal coating on a bipolar plate is a coating the provides conductor on a majority of the relevant surface.

Peaks

The peaks in a corrugated shape are the points closest to the next layer of a fuel cell stack (such as the diffusion layer, the electrode assembly or a heat conductor).

Vias

A via is a conductive pathway through a resistant layer, regardless the thickness of the resistant layer.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A stacked electrochemical power source assembly comprising:
    a) two or more electrochemical cells; and
    b) at least one bipolar plate positioned between two electrochemical cells, the bipolar plate comprising at least two resistant layers and at least one metal layer positioned between the resistant layers, wherein at least one resistant layer comprises conductive vias therethrough, and the conductive vias and the metal layer are comprised of different materials;
    wherein the at least one resistant layer of the bipolar plate and conductive vias of the resistant layer are in contact with the electrochemical cells.

2. The stacked electrochemical power source assembly of claim 1, wherein the vias are such that 50% or less of the volume of the resistant layer is conductor.

3. The stacked electrochemical power source assembly of claim 1, wherein the metal layer is porous or has a porous surface.

4. The stacked electrochemical power source assembly of claim 1, wherein the at least one bipolar plate incorporates internal channels adapted to carry a heat exchange fluid.

5. The stacked electrochemical power source assembly of claim 4, wherein the at least one bipolar plate comprises a metal layer sandwiched between two via-containing resistant layers and the internal channels are within the metal layer.

6. The stacked electrochemical power source assembly of claim 1, wherein the at least one bipolar plate is corrugated.

7. The stacked electrochemical power source assembly of claim 6, wherein at least one of two major exterior surfaces of the at least one bipolar plate has micro-channels or pits adapted to spread condensed water over the at least one of two major exterior surfaces or both major exterior surfaces.

8. The stacked electrochemical power source assembly of claim 1, wherein an exterior surface of the at least one bipolar plate is shaped to provide channels for the flow of electrochemical power source reactants.

* * * * *